Feb. 18, 1936.    J. P. TRIPP    2,031,288
ELECTRIC ARC WELDING APPARATUS
Filed June 18, 1934    3 Sheets-Sheet 2

INVENTOR
JOHN. P. TRIPP
BY J.D. O'Connell
ATTORNEY

Feb. 18, 1936.   J. P. TRIPP   2,031,288
ELECTRIC ARC WELDING APPARATUS
Filed June 18, 1934   3 Sheets-Sheet 3

INVENTOR
JOHN. P. TRIPP
BY J. D. O'Connell
ATTORNEY

Patented Feb. 18, 1936

2,031,288

UNITED STATES PATENT OFFICE 2,031,288

ELECTRIC ARC WELDING APPARATUS

John P. Tripp, Montreal, Quebec, Canada

Application June 18, 1934, Serial No. 731,134

7 Claims. (Cl. 219—8)

This invention relates to arc welding apparatus and comprises means for preventing accidental welding of the electrode to the work during operation of electric arc welding machines such, for example, as the seam welding machine of my prior application, Serial No. 663,321, filed March 29, 1933, since matured into Patent No. 1,991,128, dated February 12, 1935.

The machine described in the above application is equipped with separate motor driven mechanisms for regulating the feed of the electrode and for propelling the machine along the length of the seam during the welding operation. It is also provided with an arc striking mechanism for withdrawing the electrode from its initial contact with the work to establish the required arc at the commencement of a welding operation. In the use of this machine it sometimes happens that the arc is not successfully established by the arc striking mechanism. When this occurs the electrode is again lowered into contact with the work and welds itself to the seam. Operation of the machine must then be suspended until the electrode is broken clear. This is not very serious when using low currents and small diameter electrodes but, with the use of heavier currents and large diameter electrodes, considerable time and trouble is frequently experienced in breaking away the welded electrode.

According to the present invention, the motors controlling the feed of the electrode and the propelling of the machine along the length of the seam are automatically open circuited whenever the arc is not successfully established at the commencement of the welding operation or, after being established, is inadvertently extinguished. This is conveniently accomplished through the agency of a suitable coil operated contactor controlled by a photo-electric cell mounted adjacent the lower end of the electrode.

Proceeding now to a more detailed description reference will be had to the accompanying drawings wherein Fig. 1 is a view in side elevation of the supporting truck and other parts of a welding machine to which the present invention is applied.

Since the welding machine shown in the present drawings is substantially the same as described in my aforesaid prior application, only brief reference will be made to those elements which are not directly concerned with the present invention.

Figure 1:
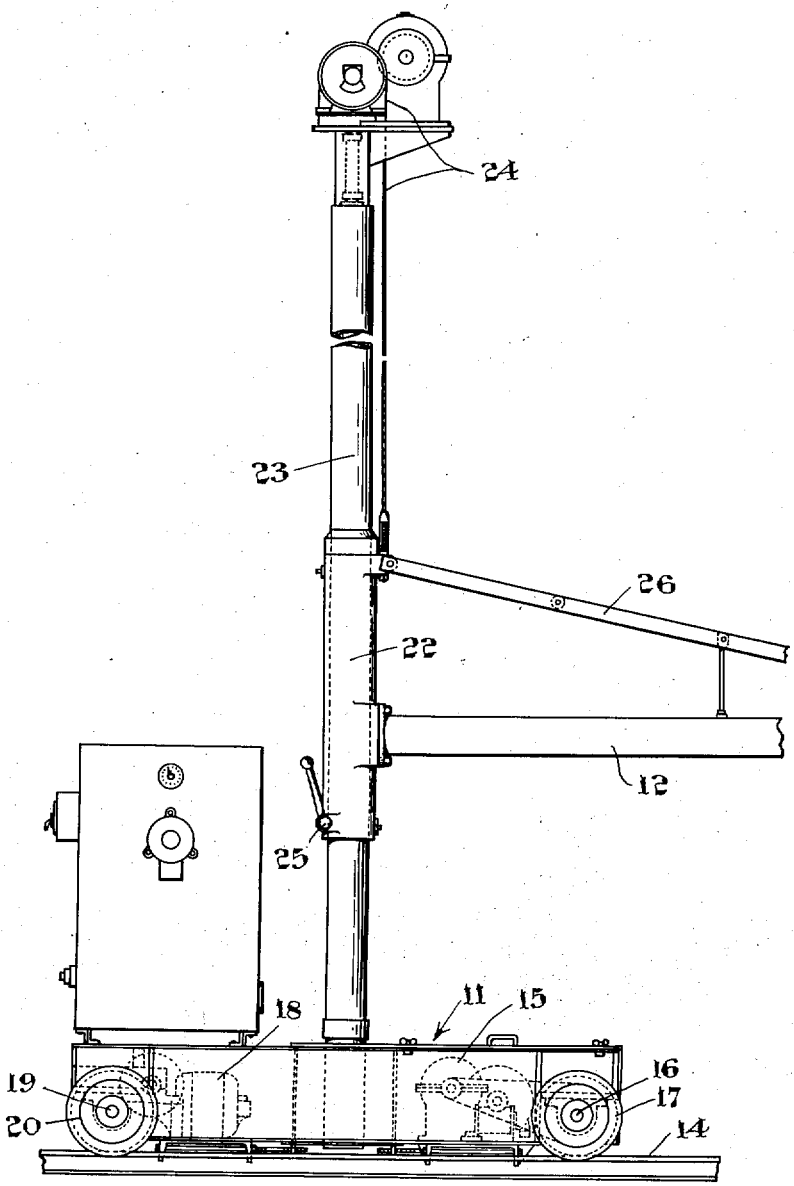
Figures 2, 3:
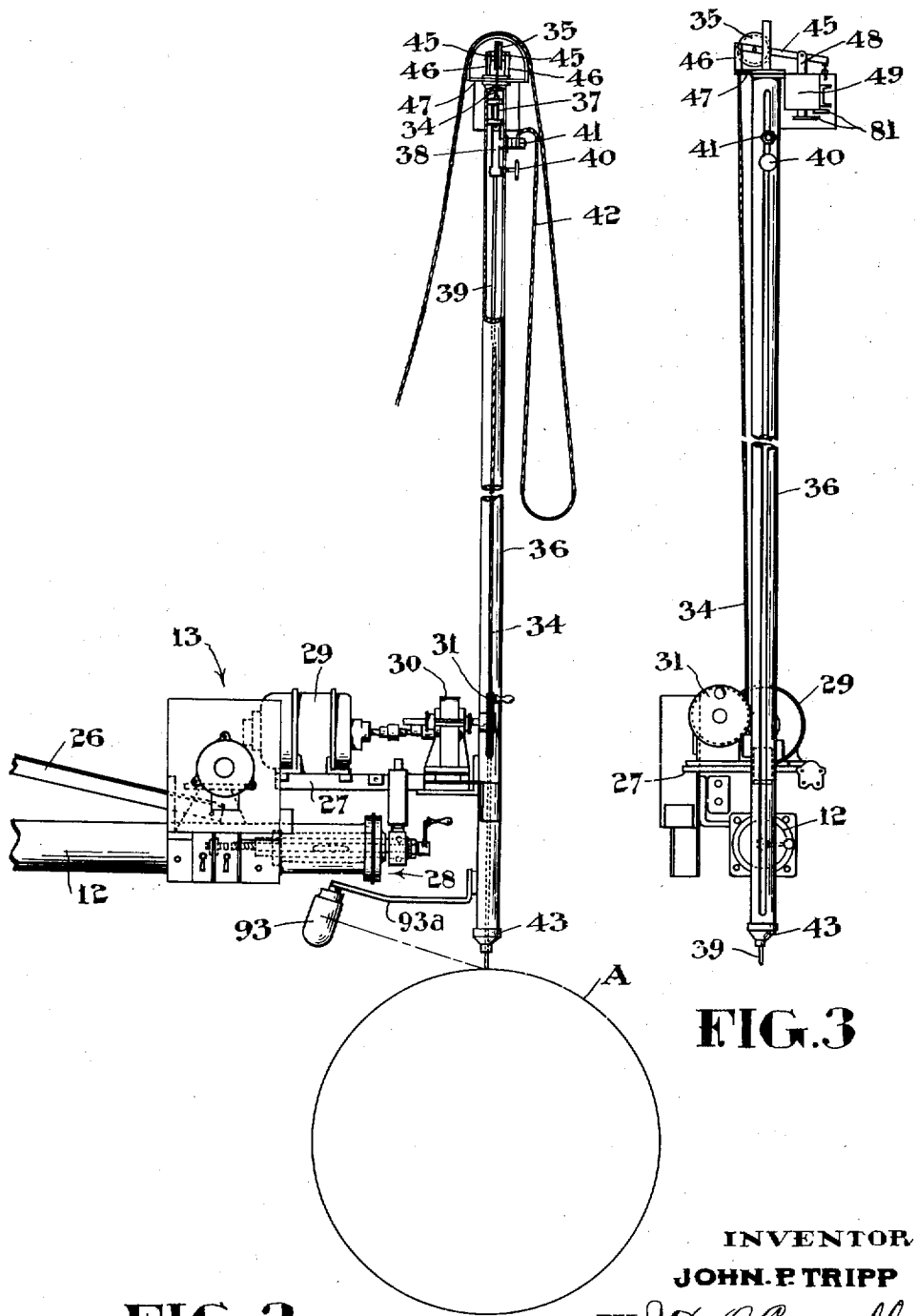
Fig. 2 is a similar view of the remaining parts showing the location of the photo-electric cell provided in accordance with this invention.
Fig. 3 is a view in front elevation of the assembly appearing in Fig. 2.

Referring to Figs. 1 and 2, 11 designates a power driven truck which carries the welding equipment including the welding arm 12 and the welding head assembly 13. During welding operations the truck is propelled along the track rails 14, at a suitable welding speed, by means of a welding travel motor 15 driving the front axle 16 and the front wheels 17. A second motor 18 is also provided for driving the rear axle 19 and rear wheels 20. The last mentioned motor is used only as a rapid travel motor for quickly propelling the truck to a proper position with respect to the work before commencement of the welding operation or for quickly returning the truck to its starting position after it has completed a run under the influence of the welding travel motor 15. Suitable clutch mechanism for enabling the two motors to be used selectively is disclosed in my aforesaid prior application.

One end of the welding arm 12 is bolted to a sleeve 22 fitted on a guide column 23 rising from the truck 11. The upper end of the column carries a hoisting mechanism 24 by means of which the sleeve and welding arm are raised and lowered to provide for the welding of pipes of different diameters. Sleeve 22 is also turnable on the column 23 to permit swinging of the welding arm from the position shown to a position at right angles to the direction of travel. After being adjusted the sleeve is clamped to the column by suitable clamping means indicated at 25. Inclined stays 26 are also provided to assist in supporting the welding arm from the sleeve 22.

Figure 4:
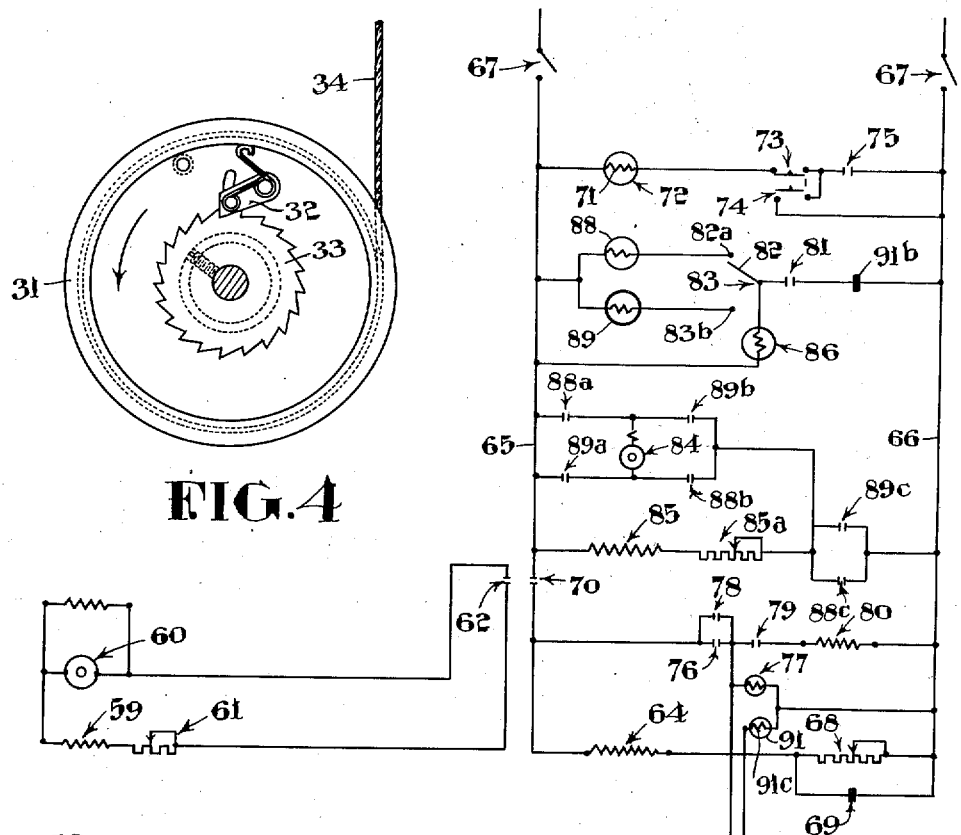
Fig. 4 is an enlarged detail of the ratchet drum assembly forming part of the electrode feed mechanism disclosed in the preceding figures.

The welding head asembly includes a main casting 27 supported from the outer end of the welding arm 12 by adjusting means 28 which is more particularly described in my prior application and forms no part of the present invention. The casting 27 carries a motor 29 driving the high speed shaft of a worm gear reducer 30. A rope drum 31, loosely mounted on the slow speed shaft of the speed reducer 30, is provided (see Fig. 4) with a spring pressed pawl 32 engaging a ratchet 33 fixed to said shaft. A rope 34, having one end attached to the drum 31, is carried upwardly over a sheave 35 at the upper end of a tubular electrode guide tube 36 also attached to the casting 27. From the sheave 35 the rope 34 passes downwardly into the tube 36 where its remaining end is connected to a guide piston 37. This piston carries a socket member 38 in which the upper end of the electrode 39 is secured by a clamping screw 40. It also carries a terminal 41 to which current is supplied by a conductor 42. At its lower end the electrode 34 protrudes through a guide opening in a cap 43 closing the lower end of tube 36.

Sheave 35 is carried between a pair of levers 45 pivoted, at one end, to posts 46 rising from a plate 47 attached to the upper end of tube 36. Adjacent their free ends these levers 45 are connected to the movable core 48 of a shunt wound arc striking solenoid 49.

Figure 5:
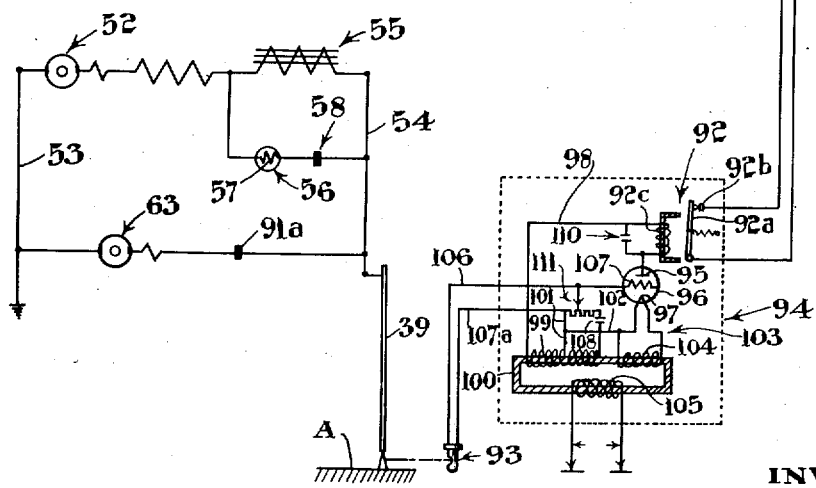
Fig. 5 is a wiring diagram showing certain electrical connections and control mechanism entering into the present invention.

The electrical connections and controls for governing the operation of the welding generator, the welding travel motor 15, the electrode feed motor 29, and the arc striking solenoid 49 are diagammatically illustrated as part of the wiring diagram appearing in Fig. 5. As here shown the welding circuit, including the generator 52, has one side 53 connected to ground and the other side 54 connected to the electrode. This welding circuit also includes a reactor 55 and a coil operated contactor 56, the latter having its operating coil 57 shunted across the reactor in series with a pair of normally closed contacts 58. The generator 52 is provided with a separately excited field winding 59, connected across the terminals of the exciter 60 in series with an adjustable rheostat 61 and a pair of normally open contacts 62.

The electrode feed motor is reprented in Fig. 5 by the armature 63 and the shunt field winding 64, the former being connected directly across the welding circuits 53 and 54 and the latter being connected between a pair of conductors 65 and 66 which are adapted to be energized from a constant voltage source of direct current (not shown) by closure of the switches appearing at 67. An adjustable rheostat 68 and a pair of normally closed contacts 69 are shown connected in parallel with each other to provide two different paths for the flow of current between the motor shunt field 64 and the conductor 66 whenever such current flow is rendered possible by closure of a break in the conductor 65 represented by the normally separated contacts 70.

The contacts 62 in the field exciting circuit of the welding generator and the contacts 70 in the conductor 65 are arranged to be closed simultaneously whenever there is current flow in the operating coil 71 of the contactor indicated at 72. Operation of this contactor 72 and the consequent opening and closing of the contacts 62 and 70 is controlled by the normally closed stop switch appearing at 73 and the normally open starting switch appearing at 74. Momentary closure of the starting switch 74 completes the connection between the closed switch 73 and the conductor 66, thus operating the contactor 72 to close the contacts 62 and 70. Contactor 72 also operates to close a pair of normally open contacts 75 to provide a direct connection between the stop switch 73 and the conductor 66 so that the operating coil of contactor 72 will continue to be energized, even after the starting switch 74 is permitted to open, so long as the stop switch 73 remains closed.

The closure of the contacts 62 energizes the welding generator so that a welding potential is immediately available in the welding circuits 53 and 54. The simultaneously closure of the contacts 70 energizes the electrode feed motor so that the ratchet 33 on the motor shaft (see Fig. 4) is turned in the direction indicated by the arrow which permits turning of the ratchet drum 31 in the same direction in response to the pull exerted on the rope 34 by the weight of the electrode assembly, which is attached to the free end of said rope as previously described. The turning speed of the ratchet drum 31 and, consequently, the rate at which the electrode 39 is fed to the work is regulated at all times by the operating speed of the electrode feed motor. Prior to the actual striking of the arc the electrode feed motor is operated at a comparatively slow rate of speed since, at this time, the short circuiting of the rheostat 68 by the closed contacts 69 ensures full field on the motor regardless of the setting of the rheostat and causes the electrode 39 to be initially lowered into contact with the work at a comparatively slow speed which favors striking of the arc. When the electrode 39 contacts with the work represented at A in Fig. 5, the electrode feed motor is short circuited and immediately stops. At the same instant a flow of current is set up in the welding circuit and a small portion of this current is shunted through the operating coil 57 of the contactor 56 which operates to close a pair of normally separated contacts 76 connected between the direct current conductors 65 and 66 in series with a further coil operated contactor indicated at 77. The resulting operation of contactor 77 closes the normally open contacts 78 and 79 which are also connected across the conductors 65 and 66 in series with the operating coil 80 of the arc striking solenoid. When coil 80 is thus energized the solenoid core 48 (Fig. 3) together with the levers 45, the sheave 35, and the electrode 39 are elevated to strike the arc. Before the solenoid core 48 reaches the upper limit of its travel it closes a pair of contacts 81 (Figs. 3 and 5) to complete a path for the flow of current between the conductor 66 and the movable contact 82 of a switch 83 that controls the direction of the welding travel motor 15 which is represented in Fig. 5 by the armature 84 and the shunt field winding 85. The closure of contacts 81 also serves to connect a coil operated contactor 86 across the conductors 65 and 66. Contactor 86 thereupon operates to open the normally closed contacts 58 and 69. Opening of contacts 58 de-energizes the contactor 56 and results in reopening of the contacts 76. This cutting out of contactor 56 immediately following striking of the arc is desirable since, owing to the fluctuating nature of the welding current by which it is energized, the contactor 56 would be apt to set up undesirable vibrations if left continuously in circuit during the welding operation. The opening of the contacts 69 in response to operation of the coil 86 disrupts the shunt connection around the rheostat 68 so that the setting of the latter determines the length of the arc by regulating the rate at which the electrode is lowered toward the work during the making of the weld.

Assuming contacts 81 to be closed, the setting of the switch 83 determines the direction in which the power driven truck 11 is propelled by the welding travel motor 15. If the movable switch contact 82 is engaged with the stationary contact 82a this energizes a contactor 88 which immediately closes the normally open contacts appearing at 88a, 88b and 88c. The closure of these last mentioned contacts connects the shunt field 85 of the welding travel motor across the conductors 65 and 66 in series with an adjustable rheostat 85a and also provides a path for the flow of current through the armature 84 in a direction such that the welding travel motor is energized to propel the truck 11 forwardly during the welding operation at a speed determined by the setting of the rheostat 85a. When the welding travel motor and the truck 11 are to be operated in the reverse direction the movable contact 82 of switch 83 is engaged with the stationary contact 83b. This energizes a contactor 89 which operates to close the normally separated contacts appearing at 89a, 89b and 89c, thereby energizing the shunt field 85 and the rheostat 85a and causing current to flow through the armature 84 of the welding travel motor in a direction opposite to that provided for by the operation of contactor 88.

We come now to the additional control means provided in accordance with the present invention for preventing accidental welding of the electrode to the work when the arc is not successfully established by the operation of the arc striking solenoid, or after being established, is inadvertently extinguished. Such means comprises the two contactors indicated at 91 and 92, the latter being part of a photo-electric relay attachment including the photo-electric cell 93 and the relay amplifier unit 94. Contactor 91 includes two pairs of normally closed contacts appearing at 91a and 91b, the contacts 91a being connected in series with the armature 63 of the electrode feed motor and the contacts 91b being connected between the previously mentioned contacts 81 and conductor 66. The operating coil 91c of contactor 91 has one terminal connected to conductor 66 and the other terminal connected to the movable contact 92a of contactor 92. The remaining or stationary contact 92b of contactor 92 is connected to conductor 65 in series with contact 78.

The internal connections of the amplifier unit 94 are made so that the operating coil 92c of contactor 92 is energized to separate the normally engaged contacts 92a and 92b and thus disconnect the contactor 91 only when the resistance of the photo-electric cell is lowered by light emanating from the arc established between the electrode and the work. To this end the operating coil of contactor 92 has one terminal directly connected to the plate element 95 of an electron discharge device 96, the remaining terminal of said coil being connected to the filament 97 of said discharge device by way of conductor 98, secondary winding 99 of transformer 100, and conductors 101 and 102, the last mentioned conductor being connected to one side of the filament heating circuit 103 which includes a further secondary winding 104 of the transformer. The primary winding of the transformer, indicated at 105, is energized by any suitable source of alternating current (not shown). It will thus be seen that the operating coil of contactor 92 is connected across the plate and filament elements of the discharge device 96 in series with the transformer winding 99.

One terminal of the photo-electric cell 93 is connected by conductor 106 to the grid element 107 of the discharge device 96. The other terminal of said tube is connected to the plate element 95 of said discharge device by way of conductor 107a, transformer winding 99, conductor 98 and coil 92c.

Prior to striking the arc on the work to be welded, the condenser appearing at 108 serves to maintain the grid element of the discharge device 96 at some potential that is negative with respect to that impressed on the filament. Under these conditions the electrons are repelled by the negative charge on the grid and flow between the plate and filament elements of the discharge device is prevented. Such flow of current between the plate and filament elements can only be initiated by reducing the negative potential of the grid to bring about the necessary shift in phase relationship between grid and filament. This phase shift is provided for by connecting the photo-electric cell 93 between the plate and grid as previously described. When "dark" the resistance of the photo-electric cell is nearly infinity but when light from the arc reaches this cell the resistance drops to a few megohms, with the result that a positive or less negative potential is then impressed on the grid so that the latter then ceases to be an impedance to the flow of electrons through the tubes.

It will thus be seen that, following the flash of the arc, the operating coil of the contactor 92 will be energized to separate the contacts 92a and 92b to prevent flow of current through the operating coil 91c of the contactor 91. Under these conditions the contacts 91a and 91b will remain closed to permit normal operation of the electrode feed motor and the welding travel motor. On the other hand, if the movement of the electrode to the arc striking position fails to establish the required arc the high resistance of the tube 93 will prevent current flow through the operating coil of the contactor 92 so that the contacts 92a and 92b will remain engaged. Since the contacts 78 are also engaged at this time it will be seen that the contactor 91 will be connected across the conductors 65 and 66 and be energized to separate the normally engaged contacts 91a and 91b, thus opening the circuits of both the electrode feed motor and the welding travel motor to suspend operations with the electrode clear of the work. Assuming that the arc has been accidentally extinguished, after being established by the arc striking solenoid, the resulting cessation of current flow through the operating coil of contactor 92 will also result in closure of the contacts 92a and 92b to operate the coil 91 and thus effect separation of the contacts 91a and 91b.

When connected as herein described, tube 96 acts as a rectifier so that the current delivered therethrough is a direct pulsating current. To prevent chattering of the contacts 92a and 92b due to this pulsating current it is desirable to provide a condenser 110 connected in parallel with the coil 92c. It is also desirable that the grid potential of the electrode discharge device 96 be adjustable to a less negative value so that a lower intensity of light reaching the photo-electric cell will cause sufficient phase shift to operate the contactor 92. This is conveniently accomplished by an adjustable resistor indicated at 111.

As shown to advantage in Fig. 2 the photo-electric cell 93 is supported, adjacent the lower end of the electrode, by means of a bracket 93a fastened to the lower portion of the electrode guide tube 36.

Having thus described my invention, what I claim is:—

1. Electric arc welding apparatus comprising, in combination, an electrode feed mechanism for feeding the electrode to the work during the welding operation, an arc striking mechanism functioning to withdraw the electrode to an arc striking position following its initial contact with the work, a motor for operating said feed mechanism and means functioning automatically to deenergize said motor when the arc is not successfully established by the arc striking mechanism, said means including a photo-electric relay.

2. Electric arc welding apparatus as claimed in claim 1 wherein the last mentioned means also functions automatically to arrest operation of said feed mechanism when the arc, after being established by the arc striking mechanism, is subsequently extinguished.

3. Electric arc welding apparatus comprising, in combination, an electrode feed mechanism for feeding the electrode to the work during the welding operation, an arc striking mechanism functioning to withdraw the electrode to an arc striking position following its initial contact with the work, travel mechanism for effecting relative movement between the electrode and the work along the line of the weld, following operation of the arc striking mechanism, an electric motor for operating said electrode feed mechanism, a second motor for operating said travel mechanism and means functioning automatically to open-circuit said motors to prevent operation of the electrode feed and travel mechanisms when the arc is not successfully established by the arc striking mechanism, said means including a photo-electric relay.

4. Electric arc welding apparatus as claimed in claim 3 in which the last mentioned means also functions automatically to arrest continued operation of the electrode feed and travel mechanisms when the arc, after being established by the arc striking mechanism at the commencement of the welding operation, is subsequently extinguished.

5. Electric arc welding apparatus comprising feed mechanism functioning automatically to feed an electrode to the work during the welding operation, arc striking mechanism for withdrawing the electrode to an arc striking position following its initial contact with the work, travel mechanism functioning automatically in response to operation of the arc striking mechanism to effect relative movement of the electrode along the line of the weld and means, including a photo-electric relay, for automatically arresting said electrode feed and travel mechanisms when the operation of the arc striking mechanism fails to successsfully establish an arc between the electrode and the work.

6. Electric arc welding apparatus comprising an electrode feed mechanism including an operating motor, means for connecting said motor in a closed circuit with a source of energy to effect operation of said mechanism, a contactor adapted, when energized, to automatically open said circuit to deenergize the motor and means for automatically energizing said contactor in the absence of an arc following the initial contact of the electrode with the work and the withdrawal of the electrode to an arc striking position.

7. Electric arc welding apparatus comprising an electrode feed mechanism including an operating motor, means for connecting said motor in a closed circuit with a source of energy to effect operation of said mechanism, a contactor adapted, when energized, to automatically open said circuit to deenergize the motor and means, including a photo-electric relay, for automatically energizing said contactor in the absence of an arc following the initial contact of the electrode with the work and the withdrawal of the electrode to an arc striking position.

JOHN P. TRIPP.